United States Patent [19]

Silver

[11] Patent Number: 4,654,939
[45] Date of Patent: Apr. 7, 1987

[54] FOIL BEARING SURFACES AND METHOD OF MAKING SAME

[75] Inventor: Alexander Silver, Tarzana, Calif.

[73] Assignee: The Garrett Corporation, Los Angeles, Calif.

[21] Appl. No.: 226,322

[22] Filed: Jan. 19, 1981

Related U.S. Application Data

[62] Division of Ser. No. 033,931, Apr. 27, 1979, abandoned.

[51] Int. Cl.⁴ .............................................. B21D 53/10
[52] U.S. Cl. ................... 29/149.5 A; 384/625
[58] Field of Search ..................... 308/9, 241, DIG. 1, 308/DIG. 5, DIG. 9; 184/1 E; 204/11; 29/148.4 L, 149.5 R, 149.5 A, 149.5 S, 149.5 PM; 427/247; 156/634, 644

[56] References Cited

U.S. PATENT DOCUMENTS

| | | | |
|---|---|---|---|
| 1,129,304 | 2/1915 | Loudenbeck | 184/1 E |
| 1,266,381 | 5/1918 | Bache | 29/149.5 PM |
| 2,330,635 | 9/1943 | Siebel | |
| 2,355,949 | 8/1944 | Boutwell | 156/634 |
| 2,838,829 | 6/1958 | Goss et al. | 29/149.5 PM |
| 2,976,093 | 3/1961 | Reiling | 308/DIG. 5 |
| 3,127,224 | 3/1964 | Owens et al. | 29/149.5 PM |
| 3,341,348 | 9/1967 | Letendre et al. | |
| 3,360,312 | 12/1967 | DeWit et al. | |
| 3,677,612 | 7/1972 | Barnett et al. | 308/9 |
| 3,700,418 | 10/1972 | Mayeda | 156/644 |
| 3,882,584 | 5/1975 | Tsuya | 29/149.5 S |
| 4,005,914 | 2/1977 | Newman | 308/9 |
| 4,178,046 | 12/1979 | Silver et al. | |

FOREIGN PATENT DOCUMENTS 1056880 5/1959 Fed. Rep. of Germany .
821954 10/1959 United Kingdom .

Primary Examiner—Lowell A. Larson
Attorney, Agent, or Firm—J. Richard Konneker; Albert J. Miller

[57] ABSTRACT

A perforated foil bearing surface having dry lubricant reservoirs dispersed throughout and a method of producing such perforated foil bearing surfaces.

28 Claims, 21 Drawing Figures

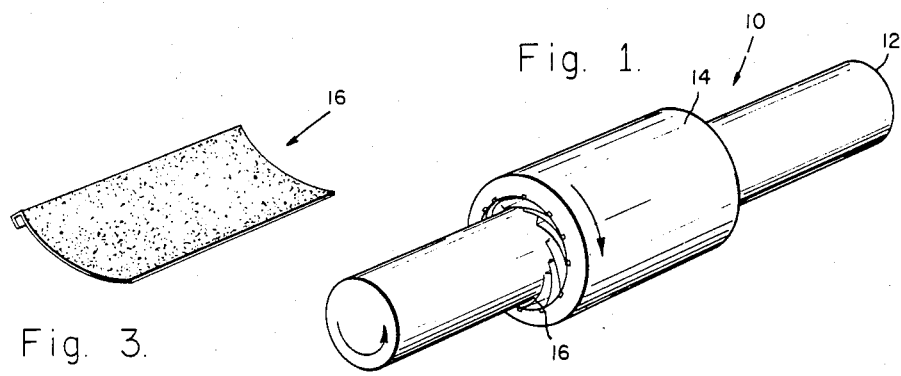
Fig. 1.
Fig. 3.
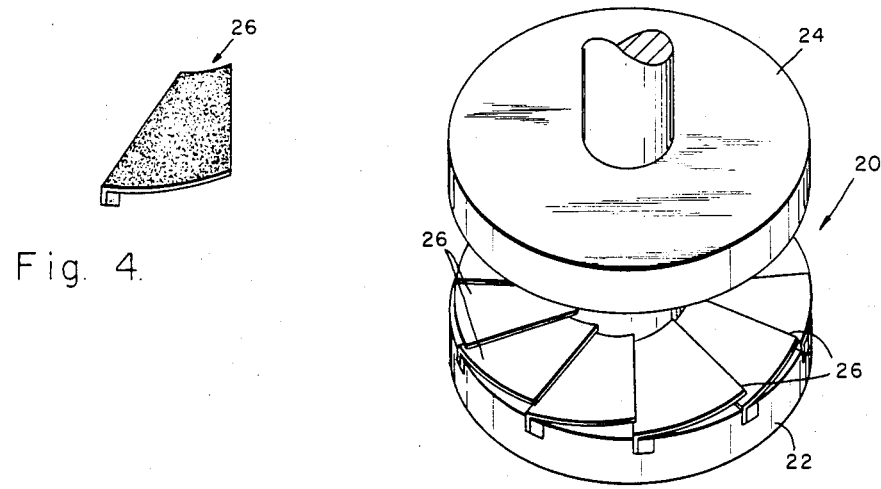
Fig. 2.
Fig. 4.
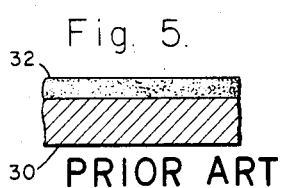
Fig. 5. PRIOR ART
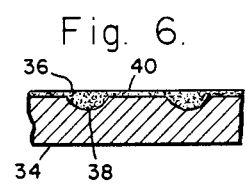
Fig. 6.
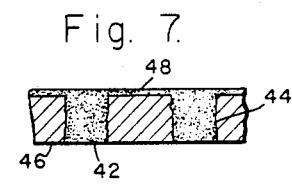
Fig. 7.
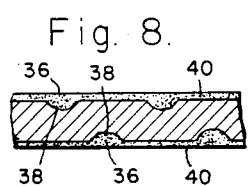
Fig. 8.
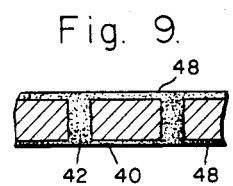
Fig. 9.
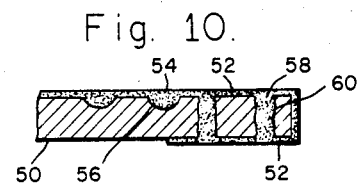
Fig. 10.

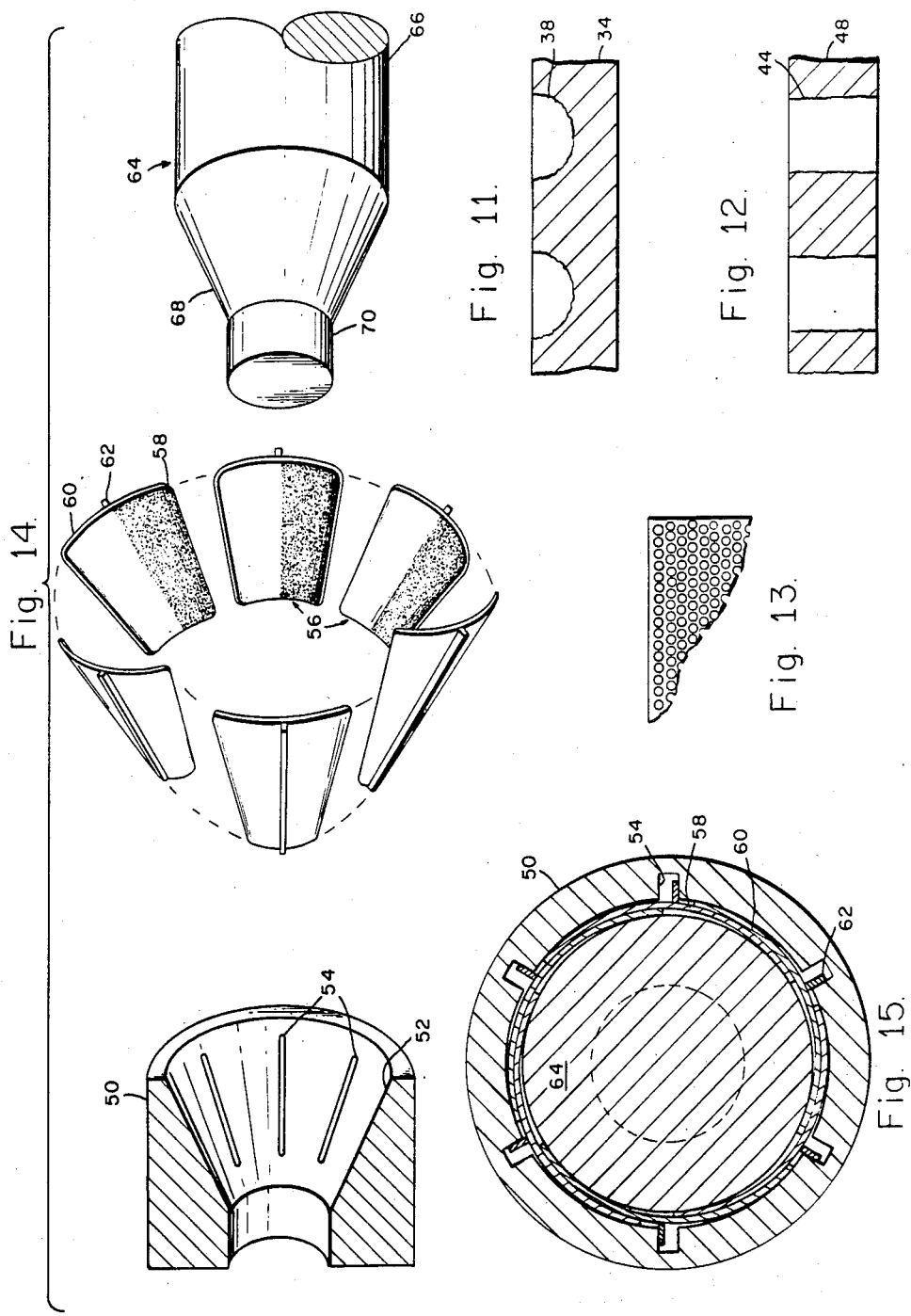

FOIL BEARING SURFACES AND METHOD OF MAKING SAME

This is a division of application Ser. No. 033,931, filed Apr. 27, 1979, now abandoned.

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capacity. While these externally pressurized or hydrostatic fluid bearings do increase the load carrying capacity, they do introduce the requirement for an external source of clean fluid under pressure.

Illustrative of hydrodynamic and/or hydrostatic bearing patents assigned to the same Assignee of this application are U.S. Pat. Nos.: 3,215,479; 3,215,480; 3,366,427; 3,375,046; 3,382,014; 3,434,762; 3,467,451; 3,511,544; 3,560,064; 3,615,121; 3,635,534; 3,642,331; 3,677,612 and 3,893,733.

In the operation of these fluid film foil gas bearings, at startup and rundown and in some cases even at higher speeds, there is actual rubbing contact between the foils and the bearing surfaces with respect to which there is relative movement. This may be between the foils and a shaft or bushing or in the case of thrust bearings, with respect to a thrust plate or runner. In any case there may also be rubbing contact where individual foils or foil stiffener elements overlap.

In order to lower the startup friction and prevent wear or galling at these contact surfaces, wherever they may be, the foils, usually a thin compliant metallic material, are often uniformly coated with a dry lubricating material which is generally softer than the contacting surface. The lubricant material may be of one kind or a mixture of such substances as fluorinated hydrocarbon polymer, graphite, or molybdenum disulfide, all of which are characteristically difficult to make adhere to any metal substrate. Usually they are mixed with a binder to produce better adhesion and other substances to increase their hardness, temperature, and wear resistance. In addition, the foil surface may be etched by various methods such as acid dipping or grit blasting or the coating may be applied by plasma spray or ion deposition means. Sometimes a primer coating with lesser lubricating qualities is applied first. Examples of patents specifically directed to foil coatings are U.S. Pat. Nos. 3,677,612 and 4,005,914 and British Pat. No. 821,954.

Such composites and their wear products tend to produce higher friction co-efficients and may produce a type of debris that doesn't easily clear itself from the bearing. The added materials may also detract from the ability of pure fluorinated hydrocarbons to resist chemical attack.

Even though the lubricating layer needed at the contact surface is quite thin, these uniform thickness coatings must start initially with an appreciable thickness to store enough lubricant to compensate for the depletion of the lubricant layer from repeated starts as the coating will wear in a way to conform to any surface curvature. As transparent spots develop on the metal surface, the surface may still be thinly but invisibly lubricated by wiping as long as fresh material keeps abrading and transferring across the bearing surface. Finally the bare spots will increase in area until there is no coating left to spread and the lubricating coating is thus depleted to the point of failure. There are many limitations however to simply increasing the thickness of the coatings, including the bearing contours and the flexing of the compliant foils.

Over the life of a foil bearing, the wear of the lubricant coating will increase the bearing clearance or "sway space" between the movable or rotatable elements. In the case of a non-linear spring loaded foil bearing journal, the preload and spring stiffness will decrease and thus allow the shaft runout to increase. To compensate for this anticipated wear, the initial preload and stiffness must generally be greater. This in turn adds to the startup friction and minimum shaft speed required for the foil bearing to become airborne.

Since the thickness of a single coating that is applied by spraying or dipping is limited to obtain the necessary smooth surface free of runs, it typically may take 2 to 3 coats to obtain 0.001 in. of thickness in some well known composite coatings based on fluorinated hydrocarbon polymers (such as Teflon-S). Curing the coating also takes longer and greater care when the coating is thicker.

Another limitation to increasing the coating thickness is its effect on the deformation "imprint" which impedes starting like a wedge under a wheel. This causes higher brakeaway friction and initial wear especially in a foil journal bearing. As the coating wears thinner it tends to act "harder" and wear more slowly. Harder coatings facilitate the transition from sliding to rolling motion needed to get started.

SUMMARY OF THE INVENTION

Foil bearing surfaces are formed with reservoirs of dry lubricant dispersed on the contact surfaces thereof in a patterned matrix such that any rubbing between surfaces will be across a number of these reservoirs. The reservoirs, which may be pores, holes, or the like are filled with a dry solid lubricant and can be produced by a photo chemical etching process or the like with the dry solid lubricant sprayed or otherwise placed into the reservoirs and on the bearing contact surfaces.

In this manner, a much thinner solid lubricant coating may be utilized on the bearing surface and that thinner coating will be continuously replenished from the reservoirs by the rubbing contact between bearing surfaces. Thus the disadvantages and limitation of the thicker lubricant coating are overcome as the necessity for these thicker coatings is eliminated.

BRIEF DESCRIPTION OF THE DRAWINGS

FIG. 1 is a perspective view of a foil journal bearing having the foil bearing surface of the present invention;

FIG. 2 is an exploded perspective view of a foil thrust bearing having the foil bearing surface of the present invention;

FIG. 3 is a perspective view of an individual foil of the foil journal bearing of FIG. 1;

FIG. 4 is a perspective view of an individual foil of the foil thrust bearing of FIG. 2;

FIG. 5 is a typical partial section of an individual foil illustrating the coating of the prior art;

FIG. 6 is a typical partial section of an individual foil of one embodiment of the present invention;

FIG. 7 is a typical partial section of an individual foil of another embodiment of the present invention;

FIG. 8 is a typical partial section of an individual foil of yet another embodiment of the present invention;

FIG. 9 is a typical partial section of an individual foil of still another embodiment of the present invention;

FIG. 10 is a typical partial section of an individual foil of a further embodiment of the present invention;

FIG. 11 is a typical partial section of an uncoated individual foil useful to form the individual foil of FIG. 6;

FIG. 12 is a typical partial section of an uncoated individual foil useful to form the individual foils of FIG. 7 or 9;

FIG. 13 is an enlarged plan view of an uncoated individual foil illustrating a typical pattern of pores or holes;

FIG. 14 is an exploded perspective view of a foil conical bearing having the foil bearing surface of the present invention;

FIG. 15 is a section view of the assembled foil conical bearing shown in exploded fashion in FIG. 14;

DETAILED DESCRIPTION OF THE PREFERRED EMBODIMENTS

Figure 16:
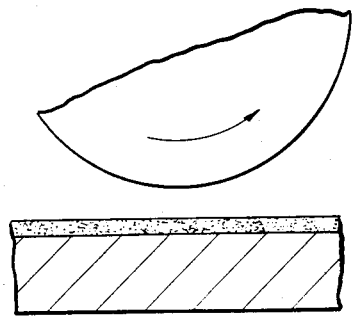
FIGS. 16, 17 and 18 illustrate in sequence the typical wear characteristics for a prior art coated foil of FIG. 5.

Referring now to FIG. 1, there is illustrated a foil journal bearing 10 having a shaft 12 rotatably disposed with respect to a bushing 14. Disposed between the shaft 12 and bushing 14 are a plurality of individual, overlapping bearing foils 16. Arrows on the end of the shaft 12 and the exterior of the bushing 14 indicate the direction of relative rotation between the shaft and bushing. It is not necessary that both the shaft and the bushing rotate. One or either of the shaft or the bushing may be stationary. It is only necessary that the relative rotation between the shaft and the bushing be in the direction indicated.

Illustrated in FIG. 2 is a foil thrust bearing 20 having a thrust plate 22 and a thrust runner 24 rotatably disposed with respect thereto. Positioned between the thrust plate 22 and the thrust runner 24 are a plurality of individual, overlapping bearing foils 26. The direction of relative rotation between the thrust plate 22 and the thrust runner 24 is indicated by an arrow on the thrust runner 24.

FIGS. 3 and 4 illustrate individual foil elements 16 and 26 respectively. Foil element 16 illustrating a typical journal bearing foil is shown in FIG. 3, while foil element 26 illustrating a typical thrust bearing foil is shown in FIG. 4. For purposes of illustration, both the journal foil element 16 and the thrust foil element 26 are shown as mounted at one end thereof. It should be understood, however, that the method of mounting the individual foils is not of importance with respect to the present invention. Alternate mounting schemes will be discussed in detail later in the application. Each of the individual foil elements 16 and 26 would be of a thin compliant metallic material and are illustrated as being coated on the side thereof exposed to the rotating element with a dry solid lubricating material such as a fluorinated hydrocarbon polymer, graphite or molybdenum disulphide. If the journal foil element 16 is mounted on the bushing 14, the side of the foil 16 exposed to the shaft 12 would be so coated.

For comparative purposes, a partial section of a typical prior art individual foil 30 illustrating the normal thickness of the dry solid lubricating material 32 is illustrated in FIG. 5 and is identified as prior art. Typically, the thickness of the prior art coating 32 illustrated in FIG. 5 would be in the order of 0.001 inches and would necessitate the application of several individual coatings to obtain this thickness.

Illustrated in FIGS. 6, 7, 8, 9 and 10 are several alternate embodiments, each shown in partial section, of individual foil elements of the present invention. Each embodiment is equally applicable to all types of foil bearings, e.g. journal, thrust or conical. The present invention is characterized by the fact that the thickness of the dry solid lubricant coating is applied in a single application and is of significantly less thickness than the coatings previously required. This is accomplished by providing reservoirs of solid lubricant of greater thickness beneath the surface of the thin solid lubricant coating.

As specifically illustrated in FIG. 6, the foil elements 34 may include reservoirs 36 of solid lubricant provided in a plurality of spaced pores or recessed 38 while FIG. 7 illustrates that the reservoirs 42 can be provided in holes 44 drilled or otherwise produced through the entire thickness of the bearing foil 46. A thin coating 40 of solid lubricant, on the order of 0.0003 inches, extend between the reservoirs 36 of FIG. 6 while a similar thin coating 48 extends between the reservoirs 42 of FIG. 7. In both cases the coated surface of the foil is a smooth continuous surface.

While FIGS. 6 and 7 illustrate a solid lubricant coating on one side of the foil element, FIGS. 8 and 9 illustrate that the coating can be provided on both sides thereof. FIG. 8 illustrates the plurality of reservoirs 36 being pores or recesses 38 on both sides of the foil bearing element 34 with the thin coating 40 therebetween. FIG. 9 illustrates the reservoirs 42 as being provided in the holes 44 through the entire foil element 46 with the coating 48 on both sides thereof.

Illustrated in FIG. 10 is a combination wherein over one portion of the foil element 50 the thin coating 52 is provided on a single side of the element 50 with dry lubricant reservoirs formed in pores or recesses 56 while over a second portion of the foil element 50 the coating 52 is provided on both sides thereof with the reservoirs 58 of dry lubricant being provided in the through holes 60.

Illustrated in FIGS. 11 and 12 are typical sections of a foil bearing element prepared for the disposition of the dry lubricant coating. A photochemical etching process can be used to produce both the individual recesses 38 on one side of a foil element 34 as shown in FIG. 11 or through holes 44 in the foil 48 element as illustrated in FIG. 12. In either case the non-etched surfaces of the foil bearing elements would be masked so that the masked portions would remain relatively smooth.

Once the individual foil bearing elements are photochemically etched as in FIGS. 11 and 12, the reservoirs can be filled with the dry solid lubricant without changing the properties or geometry of the foils to any significant degree. Since the inner surfaces of the pores or holes are etched, these surfaces are relatively rough and thus increase the adhesion thereof to the dry solid lubricant, particularly when compared to the originally smooth foil bearing element surface which has been masked. At the same time that the dry solid lubricant fills the pores or holes, a continuous thin coating is also provided over the surface of the foil bearing element between the holes or pores. A primer may be used inside the recesses, pores or holes to further improve the adhesion with the dry, solid lubricant and such primer would be omitted on the surface between the holes.

Generally the distribution of the pores or holes would be staggered in a precise pattern or matrix over the entire surface of the foil bearing element. A greatly enlarged plan view illustrating a typical pattern of pores or holes is illustrated in FIG. 13 with a hole diameter of approximately 7.5 mils and a spacing between hole centers of 15 mils. The number of holes per square inch would normally range from 2000 to 4500 holes per square inch. The pattern or matrix of holes would be staggered to provide a plurality of reservoirs across the entire rubbing surface so that no portion of the rubbing surface would not have dry lubricant material available from the reservoirs.

While FIGS. 1 through 4 have specifically illustrated end-mounted foils, it must be recognized that the present invention is applicable to all foil bearings regardless of how the individual foils are mounted. For example, the present invention is equally applicable to foils which are mounted intermediate the ends thereof as described in U.S. patent application Ser. No. 689,619 filed on May 24, 1976, now U.S. Pat. No. 4,178,046 granted Dec. 11, 1979 "Foil Bearing," and assigned to the same assignee as this application. An example of a foil conical bearing, where the individual foil elements are mounted intermediate the ends thereof, is illustrated for purposes of illustration in FIGS. 14 and 15.

The conical bearing basically comprises a bushing 50 having a conical bore 52 having a plurality of grooves 54 disposed therein. The individual foil bearing elements 56 comprise an overfoil 58 and underfoil 62 extending on either side of a mounting bar 62. The bar 62 is adapted to set into a corresponding groove 54 in the conical bore 52 in the bearing bushing 50. A shaft 64 having a cylindrical section 66, conical section 68 and a smaller cylindrical section 70 is adapted to be inserted into the bushing 50 with the individual foil bearing elements 56 disposed between the conical bore 52 of the bearing bushing 50 and the conical section 68 of the shaft 64.

By utilizing a photochemical etching process to etch numerous reservoirs to be filled with the soft dry solid lubricant in the spring hard metal foil material itself without changing the properties or geometry of the foils to any significant degree is an entirely new concept. From these reservoirs the thin film of dry solid lubricant at the contact surface is replenished automatically by the rubbing of the opposed surface which transfers and burnishes the coating material into the metal surfaces. At the same time, the ratio of exposed surface to volume of the lubricant is lowered and the area of adhesion to the interior surfaces of the foil is increased when compared to a continuous thicker coated foil.

The photochemical etching process is relatively cheap and accurate and can facilitate production to optimize diameter depth and density, for example, the number of holes per square inch. By etching only the interior of the holes or pores the original smooth foil surface is retained.

The invention makes possible the reduction in thickness of the dry lubricant coating on the foil metal surfaces. Besides reducing the thickness and corresponding thickness tolerances, the variations found in friction and wear properties are reduced since the solid dry lubricant formulations are more consistent and predictable than those of compounded and cured coatings.

Figure 19:
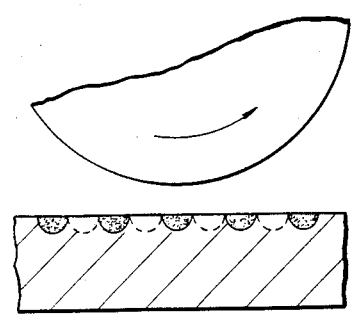
FIGS. 19, 20 and 21 illustrate in sequence for a like period the typical wear characteristics for a coated foil of the present invention.
Figure 17:
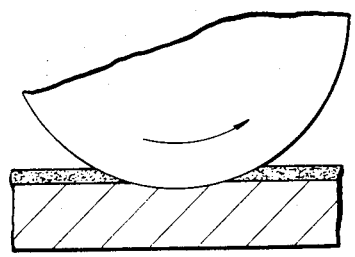
Figure 20:
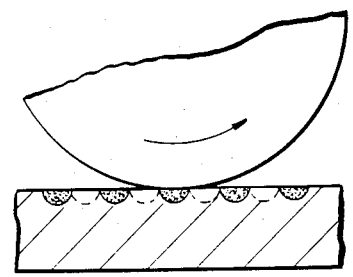
Figure 18:
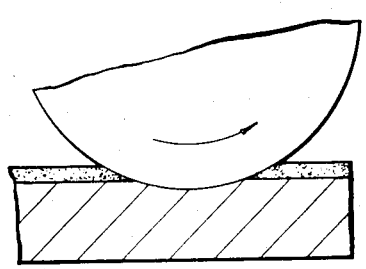
Figure 21:
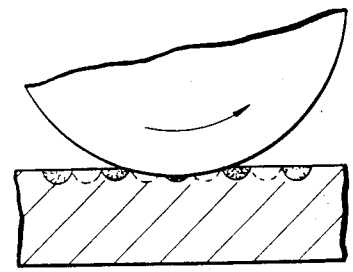

It has been empirically demonstrated that a thinner coating replenished from a plurality of reservoirs will reduce wear in foil bearing applications. For purposes of comparative illustration, FIGS. 16, 17 and 18 show typical wear for the thicker coating of the prior art while FIGS. 19, 20 and 21 illustrate typical wear for the thinner coating supported by reservoirs of the present invention. The wear process is illustrated for a like number of start cycles under basically identical operating conditions.

While specific embodiments of the invention have been illustrated and described, it is to be understood that these embodiments have been provided by way of example only, and that the invention is not to be construed as being limited thereto but only by the proper scope of the following claims:

What I claim is:

1. A method of supporting relative movement between two members, one of which being supportive of the other, comprising the steps of:
    positioning a plurality of compliant, overlapping foils between the two members, the positioned foils each having an essentially smooth rubbing contact surface facing one of the members;
    coating the rubbing contact surfaces of said foils with a dry lubricant coating; and
    providing a multiplicity of dry lubricant reservoirs beneath the surfaces of the dry lubricant coatings, each of said reservoirs being circumscribed by a portion of one of the essentially smooth rubbing contact surfaces.

2. The method of claim 1 wherein each of said overlapping foils is a spring hard metallic foil segment, and wherein said reservoir-providing step includes forming inwardly through each of said essentially smooth rubbing contact surfaces a multiplicity of mutually spaced cavities having roughened surfaces.

3. The method of claim 2 wherein said cavity-forming step is performed by chemically etching said mutually spaced cavities in said foil segments.

4. The method of claim 2 wherein, for each of said foil segments, said coating step is performed by simultaneously applying a single layer of dry lubricant to said rubbing contact surface and filling said multiplicity of cavities with dry lubricant.

5. A method of forming a compliant foil for a fluid bearing system comprising the steps of:
  photochemically etching a multiplicity of mutually spaced recesses in at least one essentially smooth rubbing contact surface of a compliant metallic foil in a manner leaving the portions of the rubbing contact surface positioned between said recesses essentially smooth; and
  simultaneously filling the multiplicity of recesses and coating the surface of the foil with a dry lubricant.

6. The method of claim 5 wherein the multiplicity of photochemically etched recesses range between 2000 to 4500 per square inch of surface area.

7. The method of claim 5 wherein the multiplicity of photochemically etched recesses are staggered rows of approximately 7.5 mil diameter on an approximate center to center spacing of 15 mils.

8. The method of claim 5 wherein the multiplicity of photochemically etched recesses are primed before being filled with dry lubricant.

9. The method of claim 5, wherein the dry lubricant is selected from the group comprising a fluorinated hydrocarbon polymer, graphite, and molybdenum disulfide.

10. A method of forming a compliant foil for using a fluid bearing system comprising the steps of:
  photochemically etching a multiplicity of holes through the compliant metallic foil; and
  simultaneously filling the multiplicity of photochemically etched through holes and coating both surfaces of the foil with a dry lubricant.

11. The method of claim 10 wherein the multiplicity of photochemically etched through holes range between 2000 to 4500 per square inch of surface area.

12. The method of claim 10 wherein the multiplicity of photochemically etched through holes are staggered rows of approximately 7.5 mil diameter on an approximate center to center spacing of 15 mils.

13. The method of claim 10 wherein the multiplicity of photochemically etched through holes are primed before being filled with dry lubricant.

14. The method of claim 10 wherein the dry lubricant is selected from the group comprising a fluorinated hydrocarbon polymer, graphite, and molybdenum disulfide.

15. A method of forming a compliant foil for a fluid bearing system comprising the steps of:
  photochemically etching a multiplicity of recesses over a first portion of the compliant metallic foil and a multiplicity of through holes over a second portion of the compliant foil; and
  simultaneously filling the multiplicity of recesses and through holes and coating the surfaces of the foil with a dry lubricant.

16. The method of claim 15 wherein the dry lubricant is selected from the group comprising a fluorinated hydrocarbon polymer, graphite, and molybdenum disulfide.

17. A method of constructing a coated foil member for use in a fluid bearing, said method comprising the steps of:
  (a) providing a compliant foil member having an essentially smooth rubbing contact surface;
  (b) forming in said foil member a multiplicity of reservoir cavities, each of said cavities extending inwardly through said rubbing contact surface and being circumscribed by a portion thereof; and
  (c) forming on said rubbing contact surface a dry lubricant coating which extends across and fills said reservoir cavities.

18. The method of claim 17 further comprising the steps of coating the surfaces of said reservoir cavities with primer prior to performing said forming step (c).

19. The method of claim 17 further comprising the steps of roughening the surfaces of said reservoir cavities prior to performing said forming step (c).

20. The method of claim 17 wherein said forming steps (b) and (c) are performed in such manner that the thickness of said dry lubricant coating is substantially less than the depths of said reservoir cavities.

21. A coated foil member constructed by the method of claim 17.

22. A method of constructing a coating foil member adapted to be positioned between a duality of relatively movable elements of a fluid bearing for intermittent rubbing engagement with one of the elements during bearing operation, said method comprising the steps of:
  (a) providing a compliant foil member having an essentially smooth rubbing contact surface;
  (b) coating said rubbing contact surface with a single thin layer of dry lubricant; and
  (c) forming in said foil member a multiplicity of mutually spaced dry lubricant reservoirs disposed beneath said essentially smooth rubbing contact surface and communicating with said single layer of dry lubricant thereon, said reservoirs being relatively positioned to automatically replenish surface lubricant rubber away from said rubbing contact surface during bearing operation.

23. A coated foil member constructed by the method of claim 22.

24. A method of forming a self-replenishing protective lubricant coating on an essentially smooth side surface of a compliant fluid bearing foil without appreciably altering the geometry or compliancy of the foil, said method comprising the steps of:
  (a) forming inwardly through the smooth side surface, in a predetermined mutually spaced arrangement thereon, a multiplicity of reservoir cavities; and
  (b) simultaneously filling said cavities with dry lubricant and forming on the side surface a dry lubricant coating which overlies the filled cavities and has a thickness substantially less than their depths.

25. A fluid bearing foil member having a lubricant coating formed thereon by the method of claim 24.

26. A method of forming a dry lubricant-coated compliant foil suitable for use in a high speed fluid foil bearing, said method comprising the steps of:
  (a) providing a compliant bearing foil member having an essentially smooth surface;
  (b) masking said surface in a manner leaving a multiplicity of mutually spaced portions thereof exposed;
  (c) etching the masked surface to thereby form in said foil member a mutually spaced multiplicity of recesses extending inwardly through said surface, each of said recesses having a roughened surface and being circumscribed by a still-essentially smooth portion of said surface; and (d) simultaneously filling said multiplicity of recesses and coating said surface with a dry lubricant material.

27. A method of constructing a fluid foil bearing, said method comprising the steps of:
(a) providing a duality of bearing members;
(b) arranging said bearing members for relative movement with respect to one another;
(c) providing a thin compliant metallic foil member having an essentially smooth rubbing contact surface;
(d) forming through said rubbing contact surface a multiplicity of mutually spaced recesses in a manner providing approximately 2000 to 4500 such recesses per square inch of rubbing contact surface;
(e) simultaneously filling said recesses with a dry lubricant and applying to said rubbing contact surface a coating of such dry lubricant having a thickness of approximately 0.0003 inches; and
(f) operatively positioning the coated foil between said duality of relatively movable bearing members.

28. A fluid foil bearing constructed by the method of claim 27.

* * * * *